Jan. 11, 1927. 1,613,637
O. ALBANESE
LOCKING DEVICE FOR MOTOR VEHICLES
Filed March 24, 1926

Inventor:
Oreste Albanese.
by his atty

Patented Jan. 11, 1927.

1,613,637

UNITED STATES PATENT OFFICE.

ORESTE ALBANESE, OF BOSTON, MASSACHUSETTS.

LOCKING DEVICE FOR MOTOR VEHICLES.

Application filed March 24, 1926. Serial No. 97,124.

This invention relates to a locking device for motor vehicles and is particularly, though not exclusively, adapted for use for a Ford automobile.

The object of the invention is to provide a simple device for locking the clutch and reverse pedal levers of a Ford automobile in their neutral positions and thereby making it impossible for unauthorized persons not equipped with the key of the device to operate said levers and thereby operate the motor vehicle in the accustomed manner.

The invention consists in the combination and arrangement of parts set forth in the following specification and particularly as pointed out in the claims thereof.

Referring to the drawings:—

Like numerals refer to like parts throughout the several views of the drawings.

Figure 1:
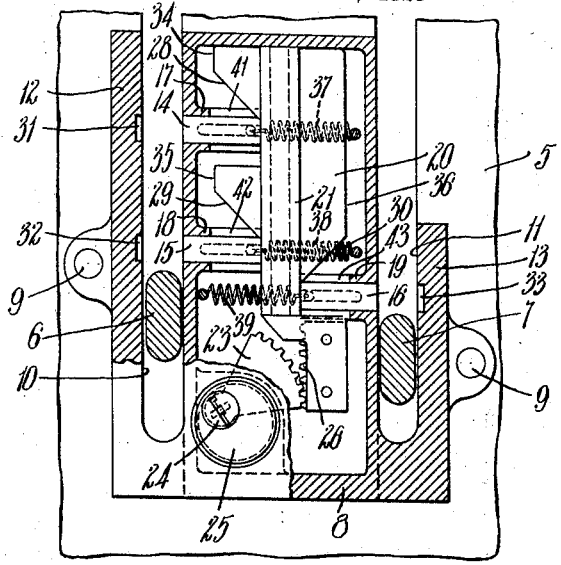
Figure 1 represents a horizontal sectional elevation of a locking device embodying my invention, the mechanism being shown in its unlocked position.
Figure 3:
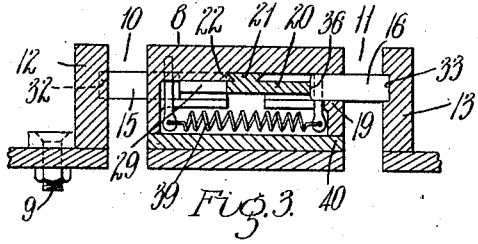
Fig. 3 is a vertical section taken on the line 3—3 of Figure 2.
Figure 4:
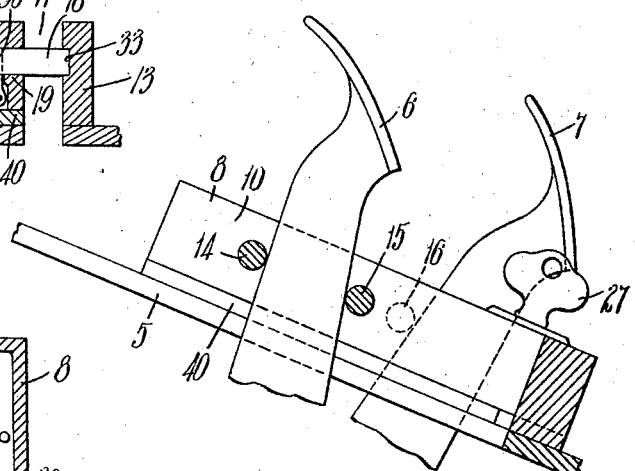
Fig. 4 is a vertical section taken on the line 4—4 of Figure 2.

In the drawings, 5 represents a foot board of a motor vehicle, 6 represents a clutch pedal lever and 7 a reverse pedal lever. In this embodiment of the invention the clutch and reverse pedal levers illustrated are those of a Ford automobile and the locking device of this invention is provided for the purpose of locking these pedal levers simultaneously in their neutral positions.

The locking device embodies therein a casing 8 which is permanently secured to the foot board 5 by a plurality of bolts 9 or any other suitable means. The casing 8 is provided with slots 10 and 11 adjacent to opposite sides thereof and extending rearwardly from the front edge thereof, the slot 10 being so positioned that the clutch pedal 6 may move forwardly and backwardly therethrough, while the slot 11 is positioned, so that the reverse pedal 7 may move forwardly and backwardly therethrough.

The presence of the slots 10 and 11 causes arms 12 and 13 to be formed at opposite sides of the casing 8, said arms being joined to the main portion of said casing at the rear thereof. Bolts 14, 15 and 16 are slidably mounted in bearing portions 17, 18 and 19 respectively formed in the central portion of the casing 8 and said bolts are adapted to be moved outwardly simultaneously to obstruct the movement of the levers 6 and 7 by a member 20 having a dove-tailed shaped portion 21 formed thereon and adapted to slide longitudinally within the casing 8 within a dove-tailed shaped groove 22.

A reciprocatory movement is imparted to the member 20 by a segment 23 rigidly fastened to a cylinder 24 of a lock mechanism 25 which may be of any well-known construction. The segment 23 meshes with a rack 26 which is rigidly fastened to the member 20. The cylinder 24 of the lock mechanism 25 is operated by a suitable key 27 and when said key is inserted within the opening provided therefor in said cylinder and said key is rotated, the member 20 may be moved forwardly or rearwardly within the casing 8.

Figure 2:
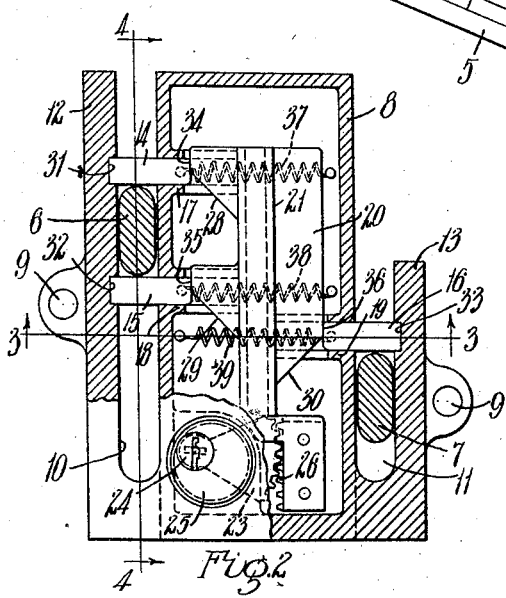
Fig. 2 is a view similar to Figure 1, but illustrating the mechanism in a position to prevent the operation of the clutch and reverse pedal levers.

The member 20 embodies therein cam surfaces 28, 29 and 30 and when it is desired to lock the pedal levers 6 and 7 the key 27 is rotated to move the member 20 from the position illustrated in Figure 1 to that illustrated in Fig. 2 and the cams 28, 29 and 30 will engage the inner extremity of the bolts 14, 15 and 16 simultaneously, throwing the bolt 14 in front of the lever 6 and the bolt 15 behind said lever, and at the same time throwing the bolt 16 in front of the lever 7. In their locked positions the bolts 14 and 15 enter recesses 31 and 32 respectively in the arm 12 and the bolt 16 enters a recess 33 in the arm 13, and at this time edge portions 34 and 35 of the member 20 engage the inner extremities of the bolts 14 and 15 respectively and an edge 36 of said member 20 engages the inner extremity of the bolt 16 and makes it impossible for a person not provided with a key 27 to move said bolts inwardly and thereby release the levers 6 and 7.

Springs 37, 38 and 39 are provided for the bolts 14, 15 and 16 respectively and said bolts are forced outwardly by the member 20 against the tension of these springs, but immediately that the key 27 is operated to release the pedal levers 6 and 7 and as the member 20 is moved forwardly by the rotation of said key, said springs 37, 38 and 39 will act to pull their respective bolts inwardly as permitted by the forward movement of the member 20.

Access is had to the interior of the casing 8 by removing a cover plate 40 which is provided for the central portion thereof, it being necessary to remove said casing from the foot board 5 in order to remove said plate from said casing.

The bearing portions 17, 18 and 19 are slotted at 41, 42 and 43 respectively to permit the cam portions 28, 29 and 30 respectively of the member 20 to slide therethrough, and said bearing portions are furthermore slotted to permit the springs 37, 38 and 39 to be attached to the bolts 14, 15 and 16 respectively.

The general operation of the mechanism hereinbefore specifically described is as follows:—When it is desired to prevent the operation of the levers 6 and 7, the former is moved forwardly into the position illustrated in Figure 2, which is the neutral position of said lever. The key 27 is then inserted within the cylinder 24 of the lock mechanism 25 and said key is rotated in the proper direction to move the member 20 to force the bolts 14, 15 and 16 outwardly and thereby obstruct the movement of said levers, at which time the various parts will be positioned as illustrated in Fig. 2. The key 27 is then removed from the lock and retained by the operator of the vehicle until it is desired to again release the levers, when said key is reinserted in said lock and moved in the proper direction to move the members 20 to release the various bolts.

When the levers 6 and 7 are locked to the locking device it is impossible to remove said device from said levers without first unlocking said device, even though the foot board may have been removed from its position upon the automobile, or the locking device may have been removed from said foot board.

It is evident that a device embodying the invention may be provided for preventing the operation of one or both of the levers 6 and 7, or any other similar type of foot pedal lever commonly employed upon the various makes of motor vehicles, and said levers may be locked in other positions than those mentioned for the purpose of preventing the operation of said vehicle without departing from the spirit of this invention.

I claim:

1. In combination an operating lever, a casing rigidly fastened to a supporting member and provided with a slot therein to receive said lever, a bolt within said casing, a member slidably mounted within said casing and provided with a cam surface thereon adapted to move said bolt into position to obstruct the movement of said lever within said slot, and a lock mechanism adapted to control the movement of said slidable member.

2. In combination an operating lever, a casing rigidly fastened to a supporting member and provided with a slot therein to receive said lever, a bolt within said casing, a member slidably mounted within said casing and adapted to move said bolt into position to obstruct the movement of said lever within said slot, a rack on said slidable member, a lock mechanism embodying therein a cylinder, a gear fast to said cylinder and engaging said rack to impart a reciprocatory movement thereto, and a key for said lock mechanism.

3. In combination an operating lever, a casing rigidly fastened to a supporting member and provided with a slot therein to receive said lever, a bolt within said casing, a member slidably mounted within said casing, a cam upon said slidable member and adapted to move said bolt into position to obstruct the movement of said lever within said slot, a rack on said slidable member, a lock mechanism embodying therein a cylinder, a gear fast to said cylinder and engaging said rack, a key for said lock mechanism, and means to withdraw said bolt from obstructing said lever when said cam has been withdrawn from engagement with said bolt.

4. In combination a plurality of operating levers, a casing rigidly fastened to a supporting member and provided with slots therein to receive said levers, a plurality of bolts within said casing, a member slidably mounted within said casing, a plurality of cams upon said slidable member each adapted to engage one of said bolts and move the same into position to obstruct the movement of one of said levers, a lock mechanism embodying therein a cylinder, means fast to said cylinder adapted to impart a reciprocatory movement to said slidable member, and a key for said lock.

In testimony whereof I have hereunto set my hand.

ORESTE ALBANESE.